(12) United States Patent
Mizoguchi (10) Patent No.: US 7,668,935 B2
(45) Date of Patent: Feb. 23, 2010

(54) COMPUTER SYSTEM AND METHOD FOR SERVICE LOAD DISTRIBUTING

(75) Inventor: Kenichi Mizoguchi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 781 days.

(21) Appl. No.: 10/926,310

(22) Filed: Aug. 26, 2004

(65) Prior Publication Data

US 2005/0050198 A1 Mar. 3, 2005

(30) Foreign Application Priority Data

Aug. 29, 2003 (JP) ............................. 2003-306616

(51) Int. Cl.
*G06F 15/16* (2006.01)
*G06F 15/173* (2006.01)

(52) U.S. Cl. ..................... 709/218; 709/224; 709/235

(58) Field of Classification Search ................. 709/218
See application file for complete search history.

(56) References Cited

U.S. PATENT DOCUMENTS

| 6,266,335 | B1 * | 7/2001 | Bhaskaran | 370/399 |
|---|---|---|---|---|
| 6,886,035 | B2 * | 4/2005 | Wolff | 709/219 |
| 6,986,139 | B1 * | 1/2006 | Kubo | 718/105 |
| 6,993,762 | B1 * | 1/2006 | Pierre | 718/102 |
| 7,284,051 | B1 * | 10/2007 | Okano et al. | 709/226 |
| 2003/0123424 | A1 * | 7/2003 | Jung | 370/338 |
| 2003/0172145 | A1 * | 9/2003 | Nguyen | 709/223 |
| 2004/0103194 | A1 * | 5/2004 | Islam et al. | 709/225 |
| 2005/0060558 | A1 * | 3/2005 | Hussain et al. | 713/189 |
| 2009/0024868 | A1 * | 1/2009 | Joshi et al. | 714/4 |

FOREIGN PATENT DOCUMENTS

| JP | 7-234847 | 9/1995 |
|---|---|---|
| JP | 10-78937 | 3/1998 |
| JP | 2000-137692 | 5/2000 |

OTHER PUBLICATIONS

Buyya; "High Performance Cluster Computing"; Architectures and Systems, vol. 1, Prentice-Hall, Inc., pp. 340-363, (1999).
Bourke; "Server Load Balancing"; O'Relly & Associates, Inc., pp. 3-31, (2001).
Kaneko et al; "Cluster Software"; Toshiba Review, vol. 54, No. 12, pp. 18-21, (1999).
Notification of Reasons for Rejection issued by the Japanese Patent Office on Oct. 24, 2006, for Japanese Patent Application No. 2004-248949, and English-language translation thereof.

* cited by examiner

*Primary Examiner*—William C Vaughn, Jr.
*Assistant Examiner*—Joiya M Cloud
(74) *Attorney, Agent, or Firm*—Finnegan, Henderson, Farabow, Garrett & Dunner, L.L.P.

(57) ABSTRACT

In a computer system executing a plurality of types of services, a service load monitor measures a load required to execute services in each of the computers. A node load monitor measures a load on each of the computers. A service optimal allocation machine determines an optimal computer and a service to be reallocated to the optimal computer, based on the measurement results of the service load monitor and the node load monitor, and reallocates the determined service to the optimal computer.

7 Claims, 4 Drawing Sheets

COMPUTER SYSTEM AND METHOD FOR SERVICE LOAD DISTRIBUTING

CROSS-REFERENCE TO RELATED APPLICATIONS

This application is based upon and claims the benefit of priority from prior Japanese Patent Application No. 2003-306616, filed Aug. 29, 2003, the entire contents of which are incorporated herein by reference.

BACKGROUND OF THE INVENTION

1. Field of the Invention

The present invention relates to a computer system including a plurality of computers and executing a plurality of services (works). More particularly, the present invention relates to a computer system and method for service load distributing in asymmetrical resource environments.

2. Description of the Related Art

Server load distributing systems are well known in which service execution requests issued from a number of client terminals are distributed to a plurality of computers to efficiently process the requests. Server load distributing systems of this type are described in, for example, Rajkumar Buyya, "High Performance Cluster Computing: Architecture and Systems (Vol. 1)", Prentice-Hall, Inc., 1999, pp. 340-363 and in Tony Bourke, "Server Load Balancing", O'Relly & Associates, Inc., pp. 3-31, December 2001. These server load distributing systems generally comprise a plurality of sever computers having symmetrical (uniform) resource environments and a load distributing unit. The load distributing unit receives a request to execute a service from a client terminal via a network (external network). Upon receiving the request, the load distributing unit determines which one of the server computers should execute the service designated by the client terminal. Selection is performed to avoid concentration of load on a particular server computer. That is, the load distributing unit distributes the execution of services of the same type to a plurality of computers.

In general, the server load distributing system employs one of the following methods to determine which computer should execute a service, i.e., to schedule services: (1) round-robin scheduling, (2) weighted round-robin scheduling, (3) a minimum connection method and (4) a fastest method. Round-robin scheduling is a method for uniformly selecting each server computer in a certain order. Weighted round-robin scheduling is a method based on round-robin scheduling, in which the frequency of selection of each server computer is determined in accordance with the capacity of each server computer. Accordingly, in weighted round-robin scheduling, a weight (selection frequency) corresponding to its capacity is assigned to each computer. The minimum connection method is for selecting a computer that has been connected a minimum number of times (for a minimum session) so far. The fastest method is for selecting a computer of a fastest response at the present stage.

The load distributing unit determines which server computer should execute a service, using one of the above methods (1) to (4). Subsequently, the load distributing unit sends a request to execute the service, issued from a client computer, to the selected server computer via a network (internal network). Upon receiving the request, the selected server computer executes the service, and sends a response to the load distributing unit. The load distributing unit returns the response from the server computer to the client terminal, i.e., the request issuer.

The load distributing unit monitors a response from each server computer. The load distributing unit detects a timeout that occurs when no response is returned from a server computer even after a predetermined time elapses. When detecting it, the load distributing unit determines that a failure has occurred in the server computer. The server computer failure includes a failure in a server computer itself, and a failure related to execution of a service by a server computer. When the load distributing unit detects a failure in a server computer, it does not allocate a service to the server computer, thereby realizing a pared-down operation of the system.

On the other hand, a computer system called a cluster system has come to be available, as is disclosed in "Cluster Software" by Tetsuo Kaneko and Ryoya Mori in Toshiba Review, Vol. 54, No. 12 (1999), pp. 18-21. In general, cluster systems comprise a plurality of computers having asymmetrical resource environments. In cluster systems, services different in function (i.e., different types of services) are allocated to a plurality of computers having asymmetrical resource environments. This allocation is beforehand closely planned by a user. Computers in a cluster system access each other via a network to detect any failure in computers currently executing services. Upon detection of a failure, the cluster system executes re-scheduling (fail-over), i.e., reallocates, to another computer, the service that is being executed by the computer from which the failure has been detected. This can reduce the service (work) interruption time, thereby realizing high availability (server operation rate, business execution rate) called "HA". This type of cluster system is called an "HA cluster system".

In general, a cluster system re-allocates a service to a standby computer. In this case, the loads on computers are not considered for scheduling services. Further, cluster systems of a static ticket type are also well known. In cluster systems of this type, a user sets a processing capacity (ticket) for each computer in the cluster system. Further, a processing capacity (ticket) needed for executing a service is set in units of services. Cluster systems of a static ticket type perform control, by setting a ticket, so as not to allocate, to a particular computer, services that exceeds the processing capacity of the computer.

As described above, the conventional server load distributing systems can perform dynamic load distributing to a plurality of server computers having symmetrical resource environments. However, the conventional server load distributing systems cannot perform dynamic load distributing to a plurality of server computers having complex asymmetrical resource environments, i.e., cannot perform reliable control of execution of services that operate in complex asymmetrical resource environments. Furthermore, the conventional server load distributing systems cannot promptly detect a failure in a computer since they perform failure detection upon timeout of a response from the computer.

On the other hand, in conventional cluster systems that have asymmetrical resource environments, load distributing is realized by user's close planning of functional load distributing. Alternatively, it is realized by a static ticket system in which a predetermined ticket is allocated in units of services. Accordingly, conventional cluster systems having asymmetrical resource environments cannot perform dynamic load distributing. Further, in the static ticket system, service allocation that is not suitable for the present status of loading may be performed.

BRIEF SUMMARY OF THE INVENTION

In accordance with an embodiment of the invention, there is provided a computer system including a plurality of computers and executing a plurality of types of services. This computer system comprises service load monitor means, node load monitor means and service optimal allocation means. The service load monitor means measures, as a service load, a load required to execute services in each of the computers. The node load monitor means measures, as a node load, a load on each of the computers. The service optimal allocation means determines an optimal computer included in the computers to execute services, and a service to be reallocated to the optimal computer, based on measurement results of the service load monitor means and the node load monitor means, and reallocates the determined service to the determined optimal computer.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
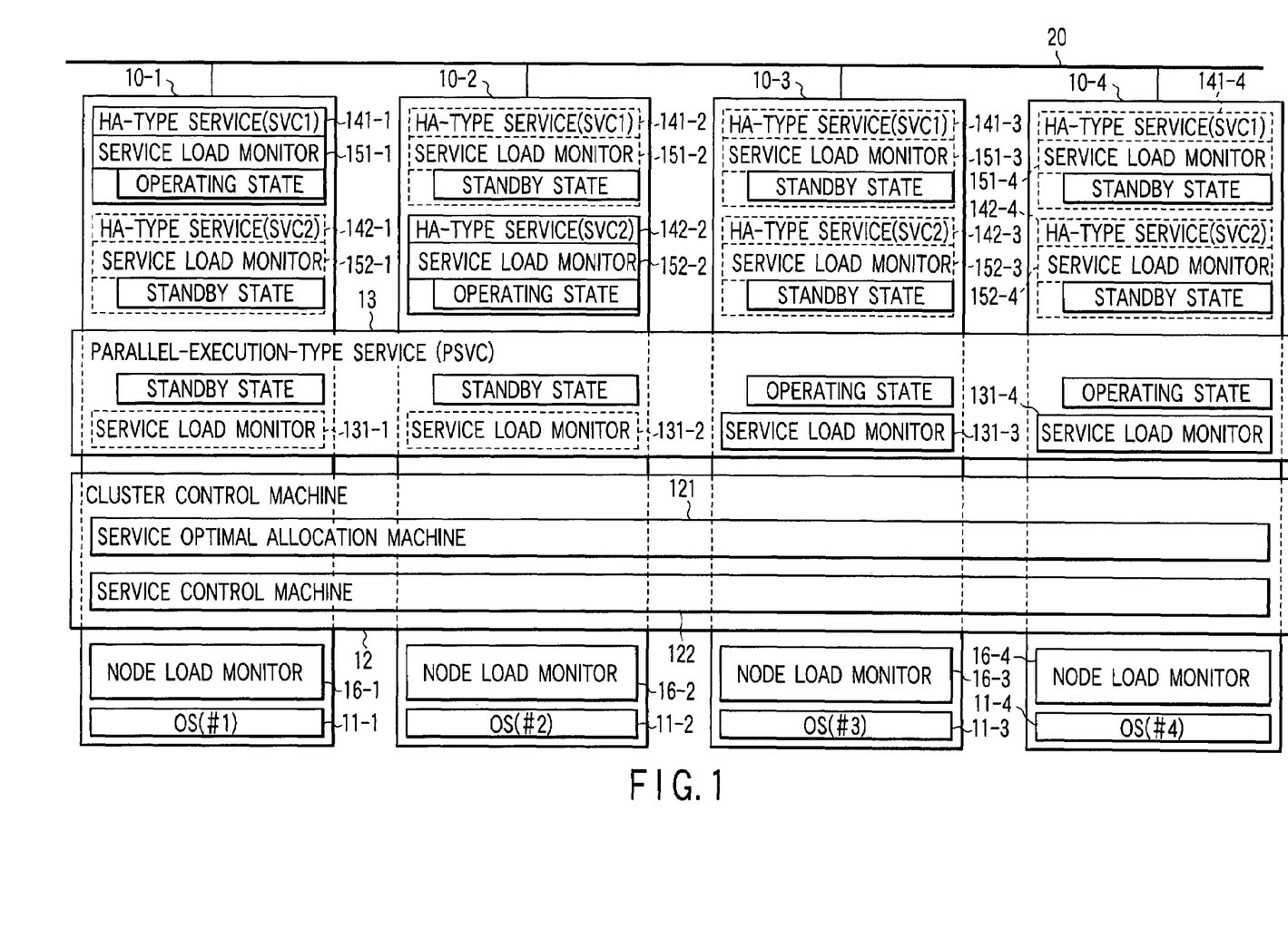
FIG. 1 is a block diagram illustrating the configuration of a cluster system according to an embodiment of the invention.

An embodiment of the invention will be described in detail with reference to the accompanying drawings. FIG. 1 is a block diagram illustrating the configuration of a cluster system according to the embodiment of the invention. The cluster system of FIG. 1 comprises four computers (server computers) 10-1 to 104. The computers 10-1 to 10-4 are connected to each other via a network (internal network) 20 used for communication between them. In FIG. 1, a network (external network) used for communication between the computers 10-1 to 10-4 and client terminals (not shown) is not shown. A request to execute a service (i.e., an application for realizing a service) issued from a client terminal is transmitted to the cluster system of FIG. 1 via the external network. The computer 10-$i$ (i=1, 2, 3, 4) of the cluster system executes a service designed by a request from a client computer. After executing the service, the computer 10-$i$ returns a response indicating the execution result to the client terminal via the external network. A single network may be used for communication between the computers 10-1 to 10-4 and between each computer 10-1 to 10-4 and each client computer. However, in this case, the communication traffic volume of the network is inevitably increased.

In the computers 10-1 to 10-4, their respective operating systems (OSs) 11-1 to 11-4 operate. In the cluster system formed of the computers 10-1 to 10-4, a cluster control machine 12 operates. The cluster control machine 12 is a virtual machine realized by the united (synchronous) operation of the respective cluster control units (not shown) of the computers 10-1 to 10-4. Therefore, it can be considered that the cluster control machine 12 exists between the computers 10-1 to 10-4. Each cluster control unit is realized when the corresponding computer 10-$i$ reads and executes a cluster control program (cluster software) including a service load distributing program. The cluster control program (cluster software) can be prestored in a computer-readable storage medium (e.g., a magnetic disk represented by a floppy (trademark) disk, an optical disk represented by a CD-ROM, DVD, etc., and a semiconductor memory represented by a flash memory), and can be distributed in the form of the storage medium. Further, this program may be downloaded (distributed) via a network. The cluster control machine 12 can promptly detect any failure in the computers when the cluster control units of the computers 10-1 to 10-4 operate in synchronism with each other while accessing each other.

The cluster control machine 12 comprises a service optimal allocation machine 121 and service control machine 122. The service optimal allocation machine 121 is realized when service optimal allocation units (not shown) provided in the computers 10-1 to 10-4 operate in synchronism with each other while accessing each other. The service optimal allocation machine 121 has a function for determining an optimal computer for execution of a service when a failure has occurred in a computer that is executing the service, or when the load of the service has changed. The service optimal allocation machine 121 also has a function for reallocating a service to the determined optimal computer. The service optimal allocation machine 121 further has a function for adjusting, to an optimal value, the number of executions of a service (parallel-execution-type service PSVC) executed in parallel by a parallel-execution-type service executing machine 13, described later. The service control machine 122 is realized when service control units (not shown) provided in the computers 10-1 to 10-4 operate in synchronism with each other while accessing each other. The service control machine 122 has a function for switching a service over to the computer determined by the service optimal allocation machine 121, under the control of the service optimal allocation machine 121.

In the cluster system of FIG. 1, the parallel-execution-type service executing machine 13 operates. The parallel-execution-type service executing machine 13 is controlled by the cluster control machine 12. Like the cluster control machine 12, the parallel-execution-type service executing machine 13 is a virtual machine realized by the computers 10-1 to 10-4, and can be considered to exist therebetween. The parallel-execution-type service executing machine 13 has a function for executing a service PSVC in parallel on some of the computers 10-1 to 10-4 (nodes). Such a service PSVC as can be executed in parallel by the parallel-execution-type service executing machine 13 is called a parallel-execution-type service. The number of parallel executions of a parallel-execution-type service PSVC, i.e., the number of services simultaneously executed in the computers used (=the number of nodes), is determined by the service optimal allocation machine 121 of the cluster control machine 12 based on a service ticket value, described later. FIG. 1 shows a case where the number of parallel executions of the parallel-execution-type service PSVC (the number of services simultaneously executed in the computers used) is 2. That is, in the case of FIG. 1, concerning the execution of the service PSVC, the computers 10-3 and 10-4 are operating, while the computers 10-1 and 10-2 are in a standby state. In other words, in the case of FIG. 1, the parallel-execution-type service executing machine 13 is executing a parallel-execution-type service PSVC in parallel in the computers 10-3 and 10-4.

A parameter value called static service ticket value $SST_{PSVC}$ is preset for a parallel-execution-type service PSVC (an application for realizing a parallel-execution-type service PSVC). Static service ticket value $SST_{PSVC}$ indicates the amount of resources pre-estimated to be needed for executing the parallel-execution-type service PSVC in the computer 10-$i$. The resource amount indicates a static load required by the service PSVC. In the parallel-execution-type service executing machine 13, a user presets a minimum number $N_{min}$ of services. The minimum number $N_{min}$ indicates a minimum number of parallel executions of the parallel-execution-type service PSVC. The minimum number $N_{min}$ also indicates a minimum number of computers (nodes) used to execute the parallel-execution-type service PSVC in parallel.

The parallel-execution-type service executing machine 13 includes service load monitors 131-1 to 131-4 operable in the computers 10-1 to 10-4. Each service load monitor 131-$i$ ($i$=1, 2, 3, 4) operates only when the corresponding computer 10-$i$ executes the parallel-execution-type service PSVC. Each service load monitor 131-$i$ measures the use of resources while the corresponding computer 10-$i$ is executing the parallel-execution-type service PSVC. Based on the currently measured resource use, each service load monitor 131-$i$ estimates the amount of resources needed for completing the execution of the parallel-execution-type service PSVC. The estimated amount of resources indicates a dynamic load required by the service PSVC. From the estimated amount of resources, each service load monitor 131-$i$ acquires dynamic service ticket value $DST_{PSVCi}$ that indicates a dynamic load required by the service PSVC, and sends it to the cluster control machine 12.

In the computers 10-1 to 10-4, HA-type service execution units 141-1 to 141-4 for executing HA-type services SVC1 are operable. Further, in the computers 10-1 to 10-4, HA-type service execution units 142-1 to 142-4 for executing HA-type services SVC2 are also operable. The HA-type service execution units 141-1 to 141-4 and 142-1 to 142-4 are controlled by the cluster control machine 12.

HA-type services are services (applications) to be subjected to fail-over under the control of the cluster control machine 12. Each of HA-type services can be executed by only one of the computers 10-1 to 10-4 in a single time zone. In the case of FIG. 1, concerning the execution of the HA-type service SVC1, only the HA-type service execution unit 141-1 of the computer 10-1 is operating, and the other HA-type service execution units 141-2 to 141-4 of the computers 10-2 to 10-4 are in the standby state. Further, concerning the execution of the HA-type service SVC2, only the HA-type service execution unit 141-2 of the computer 10-2 is operating, and the other HA-type service execution units 141-1, 14-3 and 141-4 of the computers 10-1, 10-3 and 10-4 are in the standby state.

For the HA-type services SVC1 and SVC2 (applications for realizing the HA-type services SVC1 and SVC2), static service ticket values $SST_{SVC1}$ and $SST_{SVC2}$ are preset, respectively. The static service ticket values $SST_{SVC1}$ and $SST_{SVC2}$ are parameter values indicating the respective amounts of resources needed for the HA service execution units 141-$i$ and 142-$i$ of the computer 10-$i$ to execute the HA services SVC1 and SVC2.

The HA service execution units 141-1 to 141-4 and 142-1 to 142-4 include service load monitors 151-1 to 151-4 and 152-1 to 152-4, respectively. The service load monitors 151-$i$ and 152-$i$ ($i$=1, 2, 3, 4) operate only when the HA service execution units 141-$i$ and 142-$i$ of the computer 10-$i$ execute the HA services SVC1 and SVC2, respectively. The service load monitors 151-$i$ and 152-$i$ measure respective resource use when the computer 10-$i$ is executing the services SVC1 and SVC2. Based on the measured resource use, the monitors 151-$i$ and 152-$i$ estimate the amounts of resources needed for the computer 10-$i$ to execute the services SVC1 and SVC2. The estimated resource amounts indicate the dynamic loads required by the services SVC1 and SVC2. From the estimated resource amounts, the service load monitors 151-$i$ and 152-$i$ acquire the dynamic service ticket values $DST_{SVC1i}$ and $DST_{SVC2i}$ indicating the dynamic loads required by the services SVC1 and SVC2, respectively. The service load monitors 151-$i$ and 152-$i$ report the dynamic service ticket values $DST_{SVC1i}$ and $DST_{SVC2i}$ to the cluster control machine 12, respectively.

In the computers 10-1 to 10-4, node load monitors 16-1 to 16-4 operate, respectively. In the computers 10-1 to 10-4, static node ticket values $SNT_1$ to $SNT_4$ indicating the processing capacities (resource amounts) of the computers (nodes) 10-1 to 10-4, respectively, are preset. In the embodiment, it is assumed that the computers 10-1 to 10-4 have asymmetrical resource environments. Therefore, the computers 10-1 to 10-4 have different static node ticket values $SNT_1$ to $SNT_4$. The node load monitors 16-1 to 16-4 calculate dynamic node ticket values $DNT_1$ to $DNT_4$ from the sums $TST_1$ to $TST_4$ (hereinafter referred to as the "total service ticket value") of the ticket values of all services executed in the computers 10-1 to 10-4, and static node ticket values $SNT_1$ to $SNT_4$. The calculation of dynamic node ticket values $DNT_1$ to $DNT_4$ is carried out each time a preset inspection time is reached. Dynamic node ticket values $DNT_1$ to $DNT_4$ indicate resource amounts that can be newly used by the computers 10-1 to 10-4. The node load monitors 16-1 to 16-4 report dynamic node ticket values $DNT_1$ to $DNT_4$ to the cluster control machine 12.

The operation of the cluster system shown in FIG. 1 will now be described. When the parallel-execution-type service executing machine 13 is executing the parallel-execution-type service PSVC on the computer 10-$i$ ($i$=1, 2, 3, 4), the corresponding service load monitor 131-$i$ operates, for example, periodically each time a preset inspection time is reached. As a result, the service load monitor 131-$i$ measures the amount of resources used by the computer 10-$i$ when it is executing the service PSV thereon. Based on the measured current resource use, the service load monitor 131-$i$ calculates dynamic service ticket value $DST_{PSVCi}$ that indicates an estimated resource amount needed for the computer 10-$i$ to execute the parallel-execution-type service PSVC. In the embodiment, three estimation functions f(x), g(y) and h(z) are used for the calculation of dynamic service ticket value $DST_{PSVCi}$. The three estimation functions f(x), g(y) and h(z) are functions for acquiring the use of three resources in the computer 10-$i$, e.g., the amount x of use of a CPU, the amount y of use of a memory and a response time z. The response time z is a period ranging from the time at which the computer 10-$i$ receives, from a client terminal, a request to execute a service s, to the time at which it returns, to the client terminal, a response indicating the result of the execution. In the embodiment, dynamic service ticket value $DST_{PSVCi}$ is given by $$DST_{si} = f(x) + g(y) + h(z) \qquad (1)$$

where s represents PSVC. Dynamic service ticket value $DST_{PSVCi}$ calculated by each service load monitor 131-$i$ is reported to the cluster control machine 12.

On the other hand, the service load monitors 151-$i$ and 152-$i$ operates, for example, periodically each time a preset inspection time is reached, when the HA-type service execution units 141-$i$ and 142-$i$ are executing HA-type services SVC1 and SVC2, respectively. The service load monitors 151-$i$ and 152-$i$ calculate, like the service load monitors 131-$i$, dynamic service ticket values $DST_{SVC1i}$ and $DST_{SVC2i}$ based on the current resource use. Dynamic service ticket values $DST_{SVC1i}$ and $DST_{SVC2i}$ indicate the estimated amounts of resources needed for the computer 10-$i$ to execute the services SVC1 and SVC2. Dynamic service ticket values $DST_{SVC1i}$ and $DST_{SVC2i}$ are given by the equation (1), like dynamic service ticket values DSTpSvCi. In this case, however, s in the equation (1) represents SVC1 or SVC2. Dynamic service ticket values $DST_{SVC1i}$ and $DST_{SVC2i}$ calculated by the service load monitors 151-$i$ and 152-$i$, respectively, are reported to the cluster control machine 12.

Figure 2:
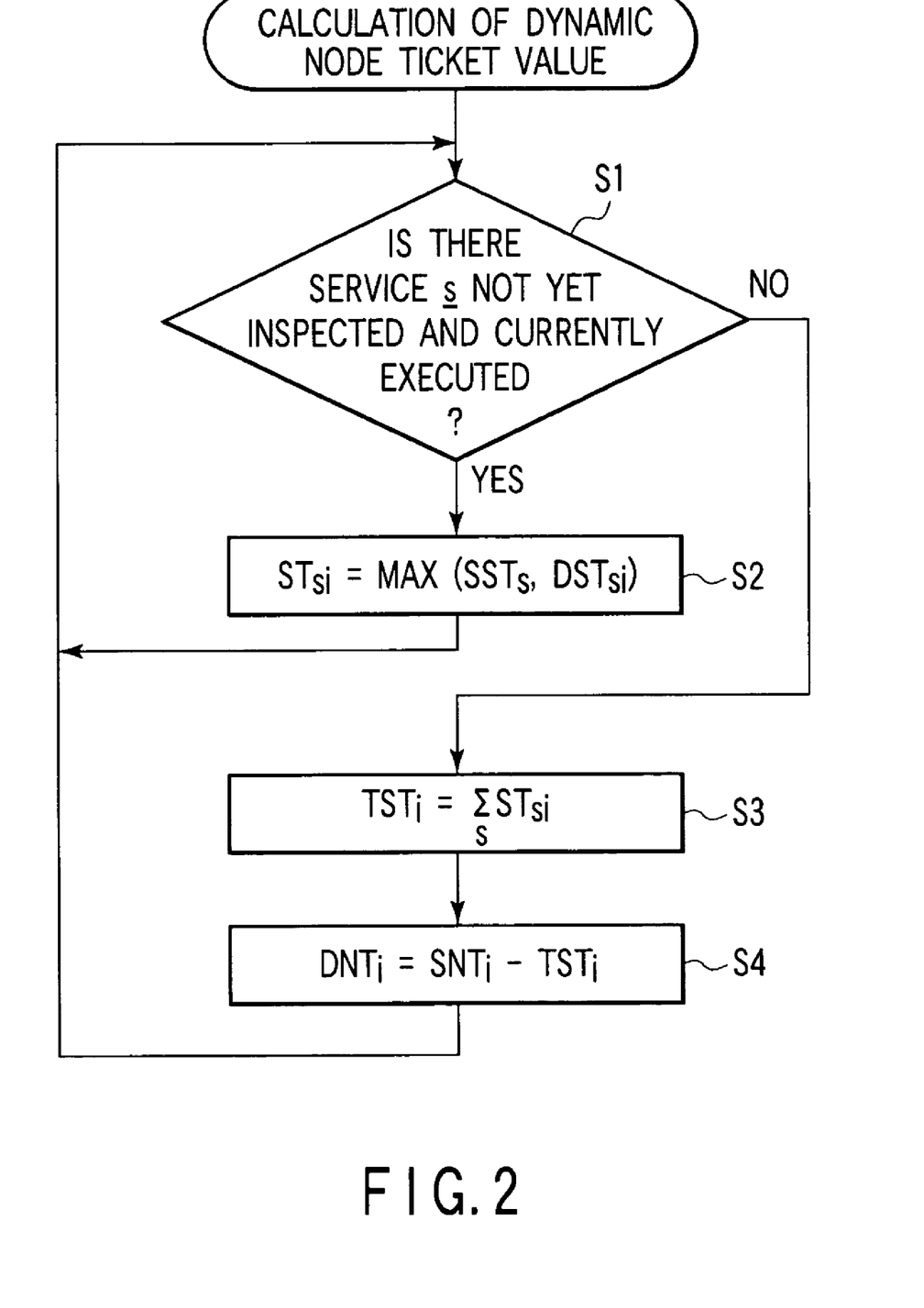
FIG. 2 is a flowchart useful in explaining the procedure of calculation of dynamic node ticket value $DNT_i$ by a node load monitor 16-$i$ (i=1, 2, 3, 4)

Referring to the flowchart of FIG. 2, the operation of the node load monitor 16-$i$ ($i$=1, 2, 3, 4) for calculating dynamic node ticket value DNTi. The node load monitor 16-$i$ acquires service ticket value $ST_{si}$ for each of the services s currently executed in the computer 10-$i$, using the following formula (steps S1 and S2):

$$ST_{si} = \text{MAX}(SST_s, DST_{si}) \quad (2)$$

Service ticket value $ST_{si}$ indicates the resource amount used by each of the services s currently executed in the computer 10-$i$, or the maximum resource amount estimated to be used by each of the services s (i.e., the maximum amount of resources that may be used by each of the services s).

After the node load monitor 16-$i$ acquires service ticket values $ST_{si}$ for each of the services s currently executed in the computer 10-$i$, the program proceeds to step S3. At step S3, the node load monitor 16-$i$ calculates the sum of service ticket values $ST_{si}$, i.e., total service ticket value $TST_i$, using the following equation:

$$TST_i = \Sigma ST_{si} \quad (3)$$

Total service ticket value $TST_i$ indicates the maximum resource amount that may be used by all services currently executed in the computer 10-$i$, i.e., the entire load on the computer 10-$i$ (the entire node load).

After the node load monitor 16-$i$ acquires total service ticket value $TST_i$ for all services currently executed in the computer 10-$i$, the program proceeds to step 64. At step S4, the node load monitor 16-$i$ calculates a ticket value indicating a resource amount that can be newly used at present in the computer 10-$i$, i.e., dynamic node ticket value $DNT_i$, using the following equation:

$$DNT_i = SNT_i - TST_i \quad (4)$$

Thus, dynamic node ticket value $DNT_i$ is calculated by subtracting total service ticket value $TST_i$ from static node ticket value $SNT_i$. The node load monitor 16-$i$ repeats periodically (i.e., at regular intervals) the above-described processing (steps S1 to S4).

Figure 3:
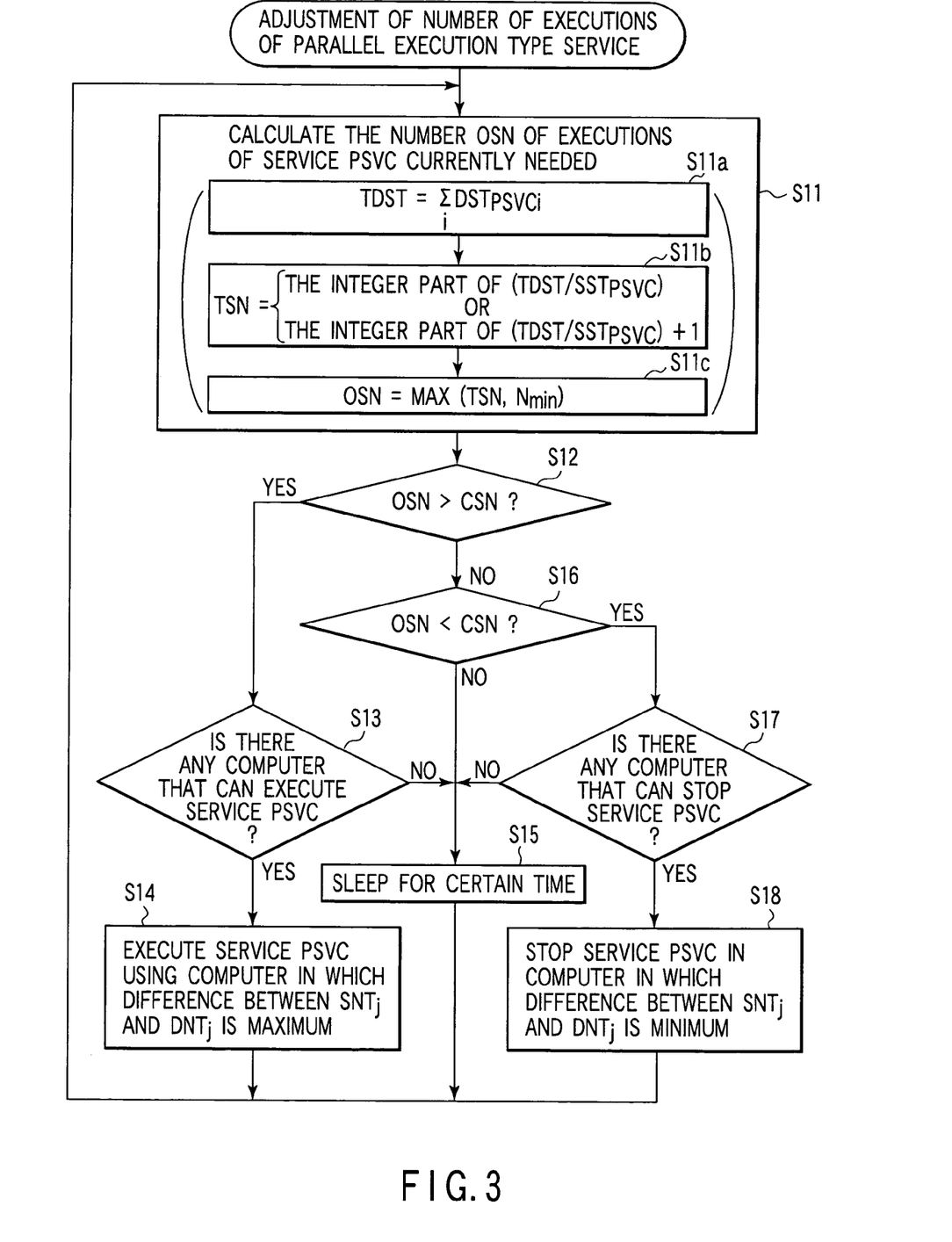
FIG. 3 is a flowchart useful in explaining the procedure of adjusting the number of executions of a parallel-execution-type service PSVC used in the embodiment.

Referring then to the flowchart of FIG. 3, a description will be given of the operation of a service optimal allocation machine 121, incorporated in the cluster control machine 12, for adjusting, to an optimal value, the number of parallel executions of the parallel-execution-type service PSVC. The service optimal allocation machine 121 calculates the number (hereinafter referred to as the "optimal number of services") OSN of parallel executions of the parallel-execution-type service PSVC (step S11). The optimal number OSN is calculated, in the manner described below, based on dynamic service ticket value DSTpSVCi in each computer (node) 10-$i$, static service ticket value $SST_{PSVC}$ and the minimum number $N_{min}$ of services.

Firstly, the service optimal allocation machine 121 calculates, using the following equation, the sum of dynamic service ticket values $DST_{PSVC1}$ to $DST_{PSVC4}$ in the computers 10-1 to 10-4, i.e., total dynamic service ticket value TDST (step S11$a$):

$$TDST = \Sigma DST_{PSVCi} \quad (5)$$

Subsequently, the service optimal allocation machine 121 calculates, as a temporal number TSN of services, the number of the parallel executions of the parallel-execution-type service PSVC currently needed, based on total dynamic service ticket value TDST and static service ticket value $SST_{PSVC}$ for the parallel-execution-type service PSVC. In other words, the service optimal allocation machine 121 calculates the temporal number TSN using the following formula (step S11$b$):

$TSN$=the integer part of ($TDST/SST_{PSVC}$) (if the remainder is zero)

$TSN$=the integer part of ($TDST/SST_{PSVC}$)+1 (if the remainder is not zero) (6)

After that, the service optimal allocation machine 121 calculates the optimal number OSN based on the temporal number TSN and preset minimum number $N_{min}$ of services. In other words, the service optimal allocation machine 121 calculates the optimal number OSN using the following equation (step S11$c$):

$$OSN = \text{MAX}(TSN, N_{min}) \quad (7)$$

Thereafter, the service optimal allocation machine 121 compares the optimal number OSN with the number CSN (hereinafter referred to as "the current number of services") of the parallel-execution-type service PSVC currently executed in parallel by the parallel-execution-type service executing machine 13. If the optimal number OSN is larger than the current number CSN (step S12), the service optimal allocation machine 121 determines whether computers 10-$j$ ($j$ is 1, 2, 3 or 4) that can newly execute the parallel-execution-type service PSVC are included in the computers 10-1 to 10-4 of the system (step S13). If such computers 10-$j$ are included, the service optimal allocation machine 121 proceeds to step S14. At step S14, the service optimal allocation machine 121 selects one of the computers 10-$j$ in which the difference //between static and dynamic node ticket values $SNT_j$ and $DNT_j$ is largest, and makes the selected computer execute the service PSVC. After that, the service optimal allocation machine 121 returns to step S11. Thus, the machine 121 selects a computer from the service-executable computers 10-$j$ in the order beginning from the largest difference between static and dynamic node ticket values $SNT_j$ and $DNT_j$, and makes the selected computer start to execute the service PSVC. This operation is repeated until the optimal number OSN reaches the current number CSN. On the other hand, if there is no service-executable computer 10-$j$ (step S13), the machine 121 sleeps for a predetermined time (step S15), and then returns to step S11.

Further, if the optimal number OSN is smaller than the current number CSN (step S16), the service optimal allocation machine 121 determines whether computers 10-$j$ ($j$ is 1, 2, 3 or 4) that can stop the currently executed parallel-execution-type service PSVC are included in the computers 10-1 to 10-4 of the system (step S17). If such computers 10-$j$ are included, the service optimal allocation machine 121 proceeds to step S18. At step S18, the service optimal allocation machine 121 selects one of the computers 10-$j$ in which the difference between static and dynamic node ticket values $SNT_j$ and $DNT_j$ is smallest, and makes the selected computer stop the execution of the service PSVC. After that, the service optimal allocation machine 121 returns to step S11. Thus, the machine 121 selects a computer from the service-executable computers 10-$j$ in the order beginning from the smallest difference between static and dynamic node ticket values $SNT_j$ and $DNT_j$, and makes the selected computer stop the execution of the service SVC. This operation is repeated until the optimal number OSN reaches the current number CSN. On the other hand, if there is no service-execution-stoppable computer 10-$j$ (step S17), the machine 121 sleeps for a predetermined time (step S15), and then returns to step S11.

As described above, in the embodiment, the optimal number OSN indicating the optimal number of parallel executions of the parallel-execution-type service PSVC executed in parallel in the cluster system (computer system) is calculated based on dynamic service ticket value $DST_{PSVCi}$ in each computer 10-$i$, static service ticket value $SST_{PSVC}$ and minimum number $N_{min}$. After that, the number of executions of the parallel-execution-type service PSVC is adjusted in accordance with the difference between the calculated optimal number OSN and the current number CSN (the number of the parallel-execution-type service PSVC currently executed in parallel). As a result, the number of executions of parallel-execution-type services can be adjusted appropriately even in the cluster system as shown in FIG. 1 and even if the computers 10-1 to 10-4 of the cluster system have asymmetrical environments.

It is assumed that the system shown in FIG. 1 can execute only one kind of parallel-execution-type services (i.e., services PSVC). However, two or more kinds of parallel-execution-type services can be executed. In this case, it is sufficient if respective optimal numbers OSN are set for different kinds of parallel-execution-type services.

Referring then to the flowchart of FIG. 4, a description will be given of optimal allocation of HA-type services or parallel-execution-type services by the service optimal allocation machine 121. The service optimal allocation machine 121 searches the computers 10-1 to 10-4 for the computer 10-$j$ in which the value of ($DNT_j$–$\Delta$) is a preset value or less, i.e., in which dynamic node ticket value $DNT_j$ may be a preset value or less (step S21). "$\Delta$" indicates a margin for searching a computer 10-$j$ having dynamic node ticket value $DNT_j$ that is actually higher than the preset value but may well become the preset value or less. In the embodiment, the preset value is zero. Alternatively, a computer 10-$j$ in which dynamic node ticket value $DNT_j$ may become a value less than the preset value may be searched for.

If it is determined at step S21 that there is no corresponding computer 10-$j$ in which dynamic node ticket value $DNT_j$ may become the preset value or less, the service optimal allocation machine 121 sleeps for a predetermined time (step S22), and then returns to step S21. If an event, such as a failure in a computer, occurs, the service optimal allocation machine 121 returns to step S21 without sleeping.

On the other hand, if there are one or more computers 10-$j$ in which dynamic node ticket value $DNT_j$ may be the preset value or less, the service optimal allocation machine 121 selects, from the computers 10-$j$, a computer 10-$j$ that is executing a service s of the lowest priority, and selects this service s (step S23). Subsequently, the service optimal allocation machine 121 determines whether the selected service s can be switched over to another computer in the system (step S24). In the embodiment, services that can be switched over are preset. In other words, concerning each service, it is predetermined whether switching over is possible. In this case, the determination at step S24 is achieved by determining whether the selected service s is included in the preset ones. The determination as to whether switching over is possible may be made in accordance with the execution state of the service s, for example, depending upon whether the service s is being processed in its critical area. Processing in a critical area means, for example, processing in which high response performance is required, or processing in which consistency (atomicity) is required, that is, processing that costs a lot for backtracking. Specifically, transaction processing, database updating processing, etc. are included.

Assume here that the selected service s can be switched over to another computer. Further, assume that computers 10-$k$ ($k$ is 1, 2, 3 or 4) can execute the selected service s. In this case, the service optimal allocation machine 121 searches the computers 10-$k$ for an optimal computer to which the selected service s is switched over in the manner described below (step S25). Firstly, the service optimal allocation machine 121 searches for a computer 10-$k$ in which dynamic node ticket value $DNT_k$ is higher than MAX ($SST_s$, $DST_{sk}$), based on dynamic node ticket value $DNT_k$, static service ticket value $SST_s$ and dynamic service ticket value $DST_{sk}$. MAX ($SST_s$, $DST_{sk}$) indicates the higher one of the values $SST_s$ and $DST_{sk}$. If a plurality of computers 10-$k$ are detected, the service optimal allocation machine 121 selects one of the computers 10-$k$ as an optimal computer to which the selected service s is switched over. It is advisable to select, as the optimal computer, a computer 10-$k$ that has the highest dynamic node ticket value $DNT_k$. Alternatively, a computer 10-$k$ having $DNT_k$ that exceeds MAX ($SST_s$, $DST_{sk}$) and closest to MAX ($SST_s$, $DST_{sk}$) may be selected.

After an optimal computer, to which the selected service s is switched over, is detected (step S26), the service optimal allocation machine 121 makes the optimal computer start to execute the service s (step S27), and then returns to step S21. If no optimal computer can be detected (step S26), the service optimal allocation machine 121 selects a computer 10-$j$, which is executing a service s of the next lowest priority, from the computers 10-$j$ in which dynamic node ticket value $DNT_j$ may be the preset value or less, and selects this service s (step S28). After that, the service optimal allocation machine 121 returns to step 24.

On the other hand, if the selected service s cannot be switched over to any other computer, the service optimal allocation machine 121 determines whether the execution of the selected service s can be stopped (step S29). In the embodiment, services that can be stopped are preset. In other words, concerning each service, whether it can be stopped is preset. Alternatively, the determination as to whether the selected service s can be stopped may be performed depending upon the execution state of the service s.

If the execution of the selected service s can be stopped, the service optimal allocation machine 121 stops its execution (step S30). After that, the machine 121 returns to step S21. If, on the other hand, the execution of the selected service s cannot be stopped, the machine 121 selects a computer 10-$j$, which is executing a service s of the next lowest priority, from the computers 10-$j$ in which dynamic node ticket value $DNT_j$ may be the preset value or less, and selects this service s (step S31). After that, the machine 121 returns to step 24.

Thus, in the embodiment, the service s, executed in a computer 10-$j$ in which dynamic node ticket value $DNT_j$ may be a preset value or less, can be switched over to and executed by a computer 10-*k* in which dynamic node ticket value $DNT_k$ is more than the higher one of the static service ticket value $SST_s$ and dynamic service ticket value $DST_{sk}$. As a result, optimal load distributing is realized. That is, in the embodiment, if a failure occurs in a computer or a significant change occurs in service or node load, the service optimal allocation machine 121 automatically performs reallocation of services.

Figure 4:
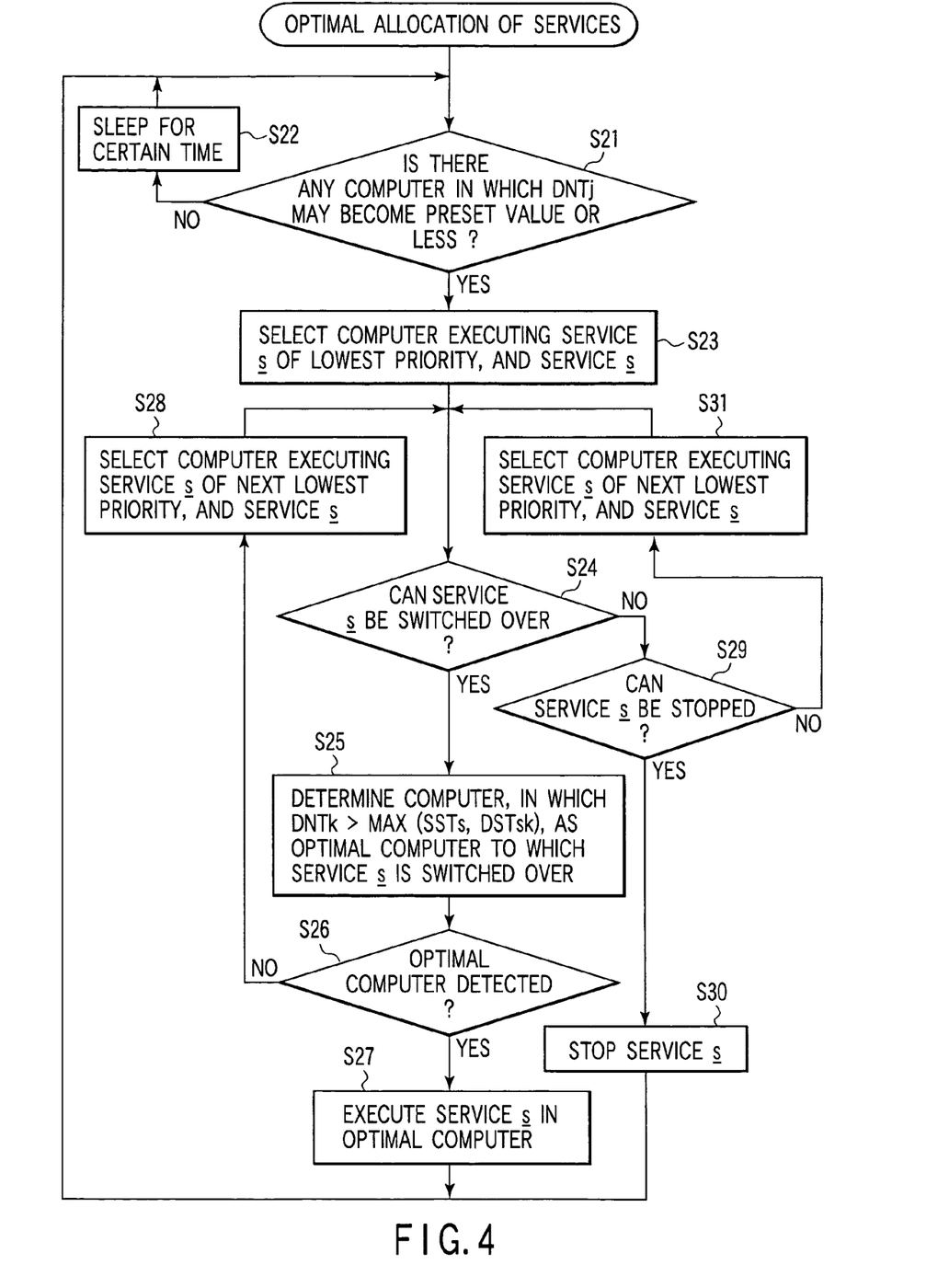
FIG. 4 is a flowchart useful in explaining the procedure of optimally arranging services (HA type services or parallel-execution-type services).

The flowchart of FIG. 4 does not show the case where an optimal computer to which the selected service s is switched over is not detected even after steps S24, 25, 26 and 28 are repeated. Similarly, FIG. 4 does not show the case where no stoppable service s is detected even after steps S24, 29 and 31 are repeated. In these cases, a user may perform setting in which, for example, other service s is switched over or stopped. If there is no optimal computer, the selected service may be stopped until an optimal computer is detected, or nothing may be done.

In the above-described embodiment, a cluster system is assumed which can execute parallel-execution-type services as well as HA-type services. However, the present invention is not limited to such cluster systems, but is also applicable to a computer system (load distributing system) that can execute only parallel-execution-type services.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising a plurality of computers and executing a plurality of types of services further comprising:
service load monitor means for measuring, as a service load, a load required to execute services in each of the computers,
wherein the service load monitor means includes means for calculating, as the service load, dynamic service ticket values based on an amount of resources used when each of the computers executes services, the dynamic service ticket values indicating dynamic loads of the services;
node load monitor means for measuring, as a node load, a load on each of the computers,
wherein the node load monitor means includes:
means for calculating a total service ticket value indicating the node load of each of the computers, based on the dynamic service ticket values of the services executed in each of the computers; and
means for calculating a dynamic node ticket value as a new ticket value usable in each of the computers, based on the total service ticket value of each of the computers and a static node ticket value indicating a preset processing capacity of each of the computers;
parallel-execution-type service executing means for making at least two of the computers to execute same parallel-execution-type services in parallel; and
service optimal allocation means for determining an optimal computer included in the computers to execute services, and a service to be reallocated to the optimal computer, based on measurement results of the service load monitor means and the node load monitor means, the service optimal allocation means reallocating the determined service to the determined optimal computer,
wherein the service optimal allocation means includes:
means for selecting a service to be reallocated to the optimal computer, from the services under execution in at least one of the computers in which the dynamic node ticket value is not more than a preset value;
means for calculating an optimal number of computers used to execute the same parallel-execution-type services in parallel in the system, based on dynamic service ticket values of the same parallel-execution-type services executed by the computers, and static service ticket values indicating resource amounts pre-estimated to be needed for executing the same parallel-execution-type services in the computers; and
means for adjusting a current number of computers which are used to currently execute the same parallel-execution-type services in parallel in the system, in accordance with a difference between the current number and the optimal number.

2. The computer system according to claim 1, wherein the service optimal allocation means further includes means for searching for the optimal computer, to which the service selected by the selecting means is to be reallocated, based on the dynamic node ticket value of each of the computers.

3. The computer system according to claim 1, wherein the adjusting means includes means for selecting, if the optimal number is larger than the current number, a computer to be controlled by the parallel-execution-type service executing means to execute one of the same parallel-execution-type services, from those of the computers which can newly execute the same parallel-execution-type services, in order beginning from a largest difference between the static node ticket value and the dynamic node ticket value.

4. The computer system according to claim 3, wherein the adjusting means includes means for selecting, if the optimal number is smaller than the current number, a computer in which execution of one of the same parallel-execution-type services is to be stopped, from those of the computers in which executions of the same parallel-execution-type services can be stopped, in order beginning from a smallest difference between the static node ticket value and the dynamic node ticket value.

5. The computer system according to claim 1, wherein the adjusting means includes means for selecting, if the optimal number is smaller than the current number, a computer in which execution of one of the same parallel-execution-type services is to be stopped, from those of the computers in which executions of the same parallel-execution-type services can be stopped, in order beginning from a smallest difference between the static node ticket value and the dynamic node ticket value.

6. A method of dynamically distributing services, for use in a computer system including a plurality of computers and executing a plurality of types of services, comprising:
acquiring service load information indicating loads of services executed in each of the computers,
wherein the acquiring the service load information includes calculating, as the service load information, dynamic service ticket values based on an amount of resources used when each of the computers executes services, the dynamic service ticket values indicating dynamic loads of the services;
acquiring node load information indicating a load on each of the computers,
wherein the acquiring the node load information includes:

calculating a total service ticket value indicating the node load information of each of the computers, based on the dynamic service ticket values of the services executed in each of the computers; and calculating a dynamic node ticket value as a new ticket value usable in each of the computers, based on the total service ticket value of each of the computers and a static node ticket value indicating a preset processing capacity of each of the computers;

determining an optimal computer included in the computers to execute services, and a service to be reallocated to the optimal computer, wherein the determining includes selecting a service to be reallocated to the optimal computer, from the services under execution in at least one of the computers in which the dynamic node ticket value is not more than a preset value;

reallocating the determined service to the determined optimal computer;

executing, in parallel, same parallel-execution-type services using at least two of the computers;

calculating an optimal number of computers used to execute the same parallel-execution-type services in parallel in the system, based on dynamic service ticket values of the same parallel-execution-type services executed by the computers, and static service ticket values indicating resource amounts pre-estimated to be needed for executing the same parallel-execution-type services in the computers; and adjusting a current number of computers which are used to currently execute the same parallel-execution-type services in parallel in the system, in accordance with a difference between the current number and the optimal number.

7. A computer-readable storage medium which tangibly embodies a computer program product for enabling dynamic load distributing of services in a computer system executing a plurality of types of services, the computer system including a plurality of computers having a service load monitor and a node load monitor, comprising:

means for acquiring, from the service load monitor, service load information indicating loads of services executed in each of the computers, the service load information including dynamic service ticket values which are calculated based on an amount of resources used when each of the computers executes services, the dynamic service ticket values indicating dynamic loads of the services;

means for acquiring, from the node load monitor, a total service ticket value indicating a load on each of the computers, the total service ticket value being calculated by the node load monitor, based on the dynamic service ticket values of the services executed in each of the computers, wherein the acquiring the total service ticket value includes acquiring from the node load monitor, a dynamic node ticket value which is calculated based on the total service ticket value of each of the computers and a static node ticket value indicating a preset processing capacity of each of the computers, the dynamic node ticket value being a new ticket value usable in each of the computers;

means for determining an optimal computer included in the computers to execute services, and a service to be reallocated to the optimal computer, wherein the determining includes selecting a service to be reallocated to the optimal computer, from the services under execution in at least one of the computers in which the dynamic node ticket value is not more than a preset value;

means for reallocating the determined service to the determined optimal computer;

means for executing, in parallel, same parallel-execution-type services using at least two of the computers;

means for calculating an optimal number of computers used to execute the same parallel-execution-type services in parallel in the system, based on dynamic service ticket values of the same parallel-execution-type services executed by the computers, and static service ticket values indicating resource amounts pre-estimated to be needed for executing the same parallel-execution-type services in the computers; and means for adjusting a current number of computers which are used to currently execute the same parallel-execution-type services in parallel in the system, in accordance with a difference between the current number and the optimal number.

\* \* \* \* \*